(12) United States Patent
Bachmann et al.

(10) Patent No.: US 9,365,177 B2
(45) Date of Patent: Jun. 14, 2016

(54) METHOD AND DEVICE FOR THE SERIAL PRODUCTION OF A VEHICLE ASSEMBLY, BEARING UNIT, VEHICLE STEERING WHEEL AND HORN MODULE FOR A STEERING WHEEL ASSEMBLY AND STEERING WHEEL ASSEMBLY

(75) Inventors: Stefan Bachmann, Heimbuchenthal (DE); Ralph Frisch, Mombris (DE); Markus Haas, Sensbachthal (DE); Matthias Helmstetter, Aschaffenburg (DE); Robert Mazuch, Romania (DE); Erich Syndikus, Aschaffenburg (DE); Peter Schmid, Bobingen an der Rems (DE); Dominik Schutz, Heimbuchenthal (DE); Rainer Winsel, Niedernberg (DE)

(73) Assignee: TRW Automotive Safety Systems GmbH (DE)

( * ) Notice: Subject to any disclaimer, the term of this patent is extended or adjusted under 35 U.S.C. 154(b) by 27 days.

(21) Appl. No.: 14/238,856

(22) PCT Filed: Sep. 14, 2012

(86) PCT No.: PCT/EP2012/003850
§ 371 (c)(1),
(2), (4) Date: Apr. 2, 2014

(87) PCT Pub. No.: WO2013/037497
PCT Pub. Date: Mar. 21, 2013

(65) Prior Publication Data
US 2014/0203539 A1      Jul. 24, 2014

(30) Foreign Application Priority Data

Sep. 15, 2011   (DE) .......................... 10 2011 113 351
Feb. 14, 2012   (DE) .......................... 10 2012 002 722

(51) Int. Cl.
*B60R 21/203*  (2006.01)
*B62D 1/04*   (2006.01)

(52) U.S. Cl.
CPC ........... *B60R 21/203* (2013.01); *B60R 21/2037* (2013.01); *B62D 1/04* (2013.01); *B62D 1/046* (2013.01); *Y10T 29/49826* (2015.01); *Y10T 29/53022* (2015.01)

(58) Field of Classification Search
CPC ..... B60R 21/2037; B62D 1/046; B60Q 5/003
See application file for complete search history.

(56) References Cited

U.S. PATENT DOCUMENTS

| 5,090,731 A | 2/1992 | Fujita et al. |
| 2001/0054810 A1 | 12/2001 | Sakane et al. |

(Continued)

FOREIGN PATENT DOCUMENTS

| CN | 101466573 | 6/2009 |
| CN | 101970263 | 2/2011 |

(Continued)

*Primary Examiner* — Ruth Ilan
(74) *Attorney, Agent, or Firm* — Tarolli, Sundheim, Covell & Tummino LLP (57) ABSTRACT

A method for series production of a vehicle assembly, especially an interior assembly, including a vehicle-side support, especially a vehicle steering wheel (12), and a component to be fastened at the support, especially a horn module (14), wherein a module-side bearing unit (22) consisting of at least two bearing members (46, 50) is assigned to the component and/or a support-side bearing unit (24) consisting of at least two bearing members (26, 28) is assigned to the support, and wherein one of the bearing members (28, 50) of the respective bearing unit (22, 24) has a contact surface (34, 58) and the other one of the bearing members (26, 46) has at least one bearing surface (38, 54) includes the step of individually orientating the two bearing members (26, 28, 46, 50) of at least one bearing unit (22, 24) relative to each other as a function of the actual dimensions of the support installed and/or the component installed, fastening the two bearing members (26, 28, 46, 50) orientated relative to each other, and fastening the component to the support. The position of the support and the component relative to each other is defined by at least one bearing unit (22, 24).

20 Claims, 10 Drawing Sheets

(56) References Cited

U.S. PATENT DOCUMENTS

| | | | |
|---|---|---|---|
| 2005/0217413 A1 | 10/2005 | Specht et al. | |
| 2007/0138772 A1* | 6/2007 | Schuetz | 280/728.2 |
| 2008/0060469 A1* | 3/2008 | Schuetz | 74/552 |
| 2010/0066066 A1* | 3/2010 | Sakurai et al. | 280/731 |
| 2011/0233905 A1* | 9/2011 | Marotzke | 280/731 |

FOREIGN PATENT DOCUMENTS

| | | |
|---|---|---|
| DE | 40 38 116 | 7/1991 |
| DE | 197 28 557 | 1/1998 |
| DE | 198 44 471 | 4/1999 |
| DE | 10 2004 003 171 | 8/2005 |
| DE | 10 2004 015 529 | 10/2005 |
| DE | 601 19 176 | 3/2007 |
| DE | 10 2006 005 642 | 8/2007 |
| DE | 102006006642 | 9/2007 |
| DE | 10 2008 024 853 | 11/2009 |
| DE | 102008024863 | 11/2009 |
| DE | 10 2008 064 581 | 6/2010 |
| DE | 102008064581 | 6/2010 |
| DE | 10 2009 007 777 | 8/2010 |

* cited by examiner

METHOD AND DEVICE FOR THE SERIAL PRODUCTION OF A VEHICLE ASSEMBLY, BEARING UNIT, VEHICLE STEERING WHEEL AND HORN MODULE FOR A STEERING WHEEL ASSEMBLY AND STEERING WHEEL ASSEMBLY

RELATED APPLICATIONS

This application corresponds to PCT/EP2012/003850, filed Sep. 14, 2012, which claims the benefit of German Application Nos. 10 2011 113 351.1, filed Sep. 15, 2011 and 10 2012 002 722.2, filed Feb. 14, 2012, the subject matter, of which are incorporated herein by reference in their entirety.

BACKGROUND OF THE INVENTION

The invention relates to a method for series production of a vehicle assembly as well as an apparatus for carrying out said method. Furthermore, the invention relates to a bearing unit, a vehicle steering wheel and a horn module for such vehicle assembly as well as a steering wheel assembly.

In a number of vehicle assemblies, especially in the vehicle interior, a component is movably mounted on a vehicle-side support. An example of such vehicle assembly is a steering wheel assembly including a vehicle steering wheel and a central horn module movably supported thereon.

For optical reasons it is desired that the clearances between the support or a support-side lining and the component are as uniform and narrow as possible. On the other hand, it must be ensured that the component cannot get jammed at the support and thus the function of the movable component is restricted. The clearances required in the automotive industry are below the added-up manufacturing tolerances of the individual components, especially in the interior of a vehicle, however. Higher accuracy of the components can only be achieved, however, by a substantially greater manufacturing effort.

SUMMARY OF THE INVENTION

Therefore it is the object of the invention to provide a method for series production of such vehicle assembly permitting an orientation of a component to be fastened with the required accuracy. It is another object of the invention to provide an apparatus for carrying out this method as well as a bearing unit, a steering wheel assembly, a horn module and a vehicle steering wheel which can be manufactured by said method.

For achieving the object a method for series production of a vehicle assembly, especially an interior assembly, is provided comprising a vehicle-side support, especially a vehicle steering wheel, and a component to be mounted on the support, especially a horn module, wherein a module-side bearing unit consisting of at least two bearing members is assigned to the component and/or a support-side bearing unit consisting of at least two bearing members is assigned to the support. One of the bearing members of the respective bearing unit includes a contact surface and the other one of the bearing members includes at least one bearing surface. In accordance with the invention, the method comprises the steps of:
individually orientating the two bearing members of at least one bearing unit relative to each other as a function of the actual dimensions of the support installed and/or the component installed,
fastening the two bearing members orientated relative to each other on each other, and
fastening the component on the support, wherein the position of the support and the component relative to each other is defined by the bearing units or either of the bearing units.

This method offers the advantage that an exact orientation of the components can take place despite the high manufacturing tolerances of the individual components.

This is possible, inter alia, due to the fact that a respective bearing unit is provided at the support and/or at the component which bearing unit can be exactly orientated at the same. The bearing units then can be coupled with minimum tolerance so as to mount the component on the support. Each of the bearing units is orientated separately at the support and at the component, respectively, and is only afterwards fixed to the same. Only when the bearing units are exactly aligned, are they interconnected. Since the retaining units are orientated at the finished component or support, the actual dimensions of the support and the component, respectively, are taken into account. As an alternative to two bearing units coupled to each other, only one bearing unit could be provided between the support and the component.

The method preferably comprises the following individual steps for orientating and fastening the bearing members:
provisionally orientating the bearing members of at least one bearing unit relative to each other so that the bearing surface and the contact surface contact each other,
softening at least one, preferably both bearing members in the area of the bearing surface and the contact surface, especially by means of ultrasonic sound, and
individually finally orientating the bearing members relative to each other while deforming at least one of the bearing members in the softened area in at least one direction, preferably in three directions in space, and fastening the two bearing members to each other by material closure and/or form closure.

The bearing members of the bearing units hence need not be exactly manufactured to size but can be made to be slightly oversized. When the bearing surface and the contact surface are softened, the bearing member can be orientated to the desired position while displacing the softened material, thereby any orientation being possible. After hardening the contact surface and the bearing surface are positively adjacent to each other at the desired position of the bearing members. Subsequently the bearing members can be fixed at said position, for example by additional fastening means. However, it is also possible, especially during ultrasonic welding, that during solidifying of the softened areas of the bearing members apart from the form-fit connection also a material-fit connection is made, the latter being adapted to serve either for pre-fixing or for final fastening.

The bearing members are made especially of plastic so as to easily heat and melt them. Alternatively, it is also possible to use one bearing member of plastic material and the other of metal or a less easily melting plastic material. Only the easily melting plastic material is heated and deformed. The non-melting bearing member in this case preferably serves as sort of a matrix or male mold so that a form closure may result, when the soft plastic material is molded in or around the matrix or male mold, respectively. The two bearing members can be fastened in this case by an additional fastening means.

The bearing members are preferably positioned as a function of the actual dimensions of the support installed and/or the component installed during provisional and/or final orientation relative to each other. That is to say, prior to orientating the bearing members the actual dimensions responsible for the formation of clearances of the support and, resp., the component are detected so that the manufacturing tolerances thereof can be taken into account during orientation.

The bearing unit is preferably secured after individual orientation by additional fastening means at the support and/or at the component, especially by means of at least one bolt or at least one screw. Softening and solidifying in this embodiment virtually serves for providing an exactly orientated positive base and a positive counter-bearing, respectively. The bearing members are reliably fixed by the fastening means in the position orientated by softening and solidifying. Hence the retaining forces are mostly transmitted by the fastening means and not or only partly via the solidified material of the bearing members.

Orientation can be performed successively in plural directions ideally normal to each other. Provisional orientation is preferably performed in the plane of the bearing surface and of the contact surface, respectively, and final orientation is performed transversely, especially normal to the bearing surface and to the contact surface, respectively. That is to say, the bearing surface and, resp., the contact surface is slightly oversized. In a first step an orientation is performed in an xy direction, subsequently the final orientation is performed in the z direction toward the respective other bearing member, the softened protruding material being displaced so that after solidifying it forms a stable positive support surface for fixing at the desired position.

If the bearing members are softened by an ultrasonic welding process, the bearing member is coupled to, especially supported on a sonotrode. The sonotrode preferably can be configured so that it is movable in all three directions in space and thus at will and consequently simple orientation of the bearing members is possible. In a first method step the bearing surface and, resp., the contact surface are provisionally orientated. After that the sonotrode is activated and the bearing members are softened. After softening, the bearing members can be orientated exactly relative to each other, the softened material being partially displaced.

Preferably also the respective other component is clamped in an adjustable holder which is movable in all three directions in space and thus at will. In particular for carrying out the method a six-axis bench can be used so that easy positioning of the support and the component to be mounted is possible.

The bearing members of a bearing unit assigned to each other are preferably orientated only either based on the dimensions of the support or based on the dimensions of the component dependent on whether the bearing members are assigned to the bearing unit of the support or of the component. In addition, a measuring step may be provided in which the relative displacement of the bearing members required for final orientation is determined. That is to say, during orientation of the bearing members the manufacturing tolerances of the support and, resp., of the component are taken into account.

After orientating the bearing members, the support and the component are fixed to each other and the bearing units of the support and the component are coupled to each other, especially in that the bearing units are nested and form a guide. The bearing members thus are first fastened to the support and, resp., to the component and orientated at the same. Only after said orientation are the support and the component coupled by interconnecting the bearing units. This is possible in a simple manner by the bearing units forming a guide into which the component can be inserted.

According to the invention, the method is used for series production of a vehicle steering wheel or a horn module mounted thereon, wherein the vehicle steering wheel is a skeleton surrounded by foam material and/or can be provided with a separate cover, before a steering wheel-side bearing unit is disposed at the steering wheel. One of the bearing members of the steering wheel-side bearing unit is movable and is orientated as a function of the individual dimensions of the foam material or the cover relative to the other bearing member and is fixed to the latter. The method according to the invention is suited particularly well for manufacturing such steering wheel assembly, as for example the foam material surrounding the steering wheel can be produced with the required manufacturing tolerances only with great effort. The method allows for a more accurate and simpler positioning of the horn module at the vehicle steering wheel. The cover of the steering wheel can be foam material or leather facing, for example.

For achieving the object, furthermore a bearing unit of a vehicle assembly is provided, preferably of an interior assembly, wherein the vehicle assembly includes a vehicle-side support, especially a vehicle steering wheel, and a component to be mounted on the support, especially a horn module. In accordance with the invention, the bearing unit comprises at least two bearing members which are orientated individually, preferably in three axes relative to each other and are interconnected by form closure and/or adhesive closure especially by ultrasonic welding. The component can be placed on the support by the bearing unit with very high accuracy.

One of the bearing members of the respective bearing unit includes a contact surface and the other one of the bearing members includes at least one bearing surface, at the contact surface and/or the bearing surface at least one welding extension being formed at which the bearing members contact each other and are preferably welded to each other. The welding extension is formed to be tapered especially toward the opposite bearing member and has, for example, a trapezoidal or triangular cross-section. Hence the welding extension is adjacent to the respective other surface preferably with an edge or with a very small area. This permits rapid and energy-saving softening by means of ultrasonic welding, as the energy introduced via the sonotrode acts on a very small area. The welding extension is preferably annular and extends especially concentrically to the bearing unit in the form of a sleeve. The welding extension thus extends around said sleeve, whereby proper support can be ensured to absorb the forces introduced by the bolt or the screw.

The bearing unit is in the form of a guiding sleeve, for instance, so that the horn module can be moved in the actuating direction defined by the sleeve so as to actuate the horn.

For additionally fastening the bearing unit on the support side or the component side for example an additional fastening means formed as separate member and acting on either of the bearing members is provided. The separate member can be as stop spring, for example, or any other suitable fastening means.

Either of the bearing members can be an integrally formed extension of a steering wheel skeleton, an injection molding around the steering wheel skeleton or a horn module acceptance.

In accordance with the invention, moreover a vehicle steering wheel including at least one fastening acceptance for a horn module, especially for an airbag module, is provided, wherein at least one bearing unit according to the invention is provided at the fastening acceptance for supporting and positioning the horn module.

The one bearing member can be formed integrally with a steering wheel skeleton or an injection molding around the steering wheel, wherein in such embodiment at least three bearing units are provided to ensure stable fastening of the horn module.

In accordance with the invention, moreover a horn module, especially an airbag module, is provided for being fastened to a vehicle steering wheel, especially a vehicle steering wheel according to the invention, wherein at least one bearing unit according to the invention is provided at the module.

The bearing unit is formed e.g. integrally with a cup-shaped horn module acceptance. The bearing unit may include a radially outer sleeve-like bearing member and a radially inner sleeve-line bearing member arranged in the former, the bearing members being interconnected via a flange portion. Preferably between the bearing members a radial annular gap is provided so that they can be moved relative to each other.

In order to achieve the object, furthermore a steering wheel assembly is provided comprising a vehicle steering wheel according to the invention, a horn module according to the invention fastened to the vehicle steering wheel, wherein bearing units according to the invention via which the module is fastened to be axially movable at the vehicle steering wheel are provided between the vehicle steering wheel and the module.

Preferably a fastening means or an acceptance for a fastening means is provided at the vehicle steering wheel and/or at the module and/or another fastening means is provided at a bearing member. The fastening means is/are adapted to additionally secure the bearing member to be moved during orientation on the steering wheel side or on the module side. The fastening means are a screw and a nut, for example, and the acceptances are apertures through which the screw is guided. The acceptances are formed so that the fastening means has defined play and even when the fastening means is inserted a limited mobility for orientating the bearing members is provided, the latter nevertheless being secured to each other, however. After exact orientation the set position can be fixed by the fastening means.

The horn module is secured via a stop spring, for example, at the vehicle steering wheel, wherein a groove for clicking of the stop spring is formed at the steering wheel-side bearing unit. Thus after mounting the bearing units a simple, especially tool-less mounting of the horn module is enabled. The latter merely has to be attached to the vehicle steering wheel and can be locked with the same in a simple manner. The groove is preferably configured so that a limited movement of the horn module is possible for actuating the horn. The stop spring can be a compression spring, for instance. It is also imaginable, however, that for mounting the horn module other retaining means, for instance a bolt or a screw, are employed.

For carrying out the method further an apparatus for manufacturing a vehicle assembly, especially a steering wheel assembly is provided, the apparatus including a fixing unit for arresting the support and/or the component as well as at least one movable sonotrode. Preferably the fixing unit and the sonotrode are movable relative to each other. Although it is sufficient when only the bench or the sonotrode is movable, i.e. either the sonotrode or the bench is stationary, in a preferred embodiment, however, the apparatus includes a six-axis bench in which both the bench and the sonotrode are movable.

The apparatus according to the invention includes e.g. a measuring system determining the mutual position of the respective bearing unit with respect to the dimensions of the assigned support or component.

Moreover, a positioning system can be provided for permitting an adjustment of the bearing members relative to each other in at least one axis, preferably in all three directions in space.

For fastening the retaining means furthermore a screwing unit, especially a multi-screwing unit, can be provided for the fastening means for rapid automatic arresting of the orientated bearing unit on the support or on the component.

Of preference, a control unit is employed which controls the positioning system in response to the data established in the measuring system so as to orientate the bearing members relative to each other. Also a holder for the bearing member to be moved can be provided at the apparatus, the holder being preferably formed by the sonotrode.

For detecting the position of the support or the component the measuring system includes e.g. at least one laser. For simple positioning the positioning system comprises the afore-mentioned six-axis bench.

BRIEF DESCRIPTION OF THE DRAWINGS

Further advantages and features can be inferred from the following description in conjunction with the enclosed drawings in which.

DESCRIPTION OF EMBODIMENTS

Figure 1:
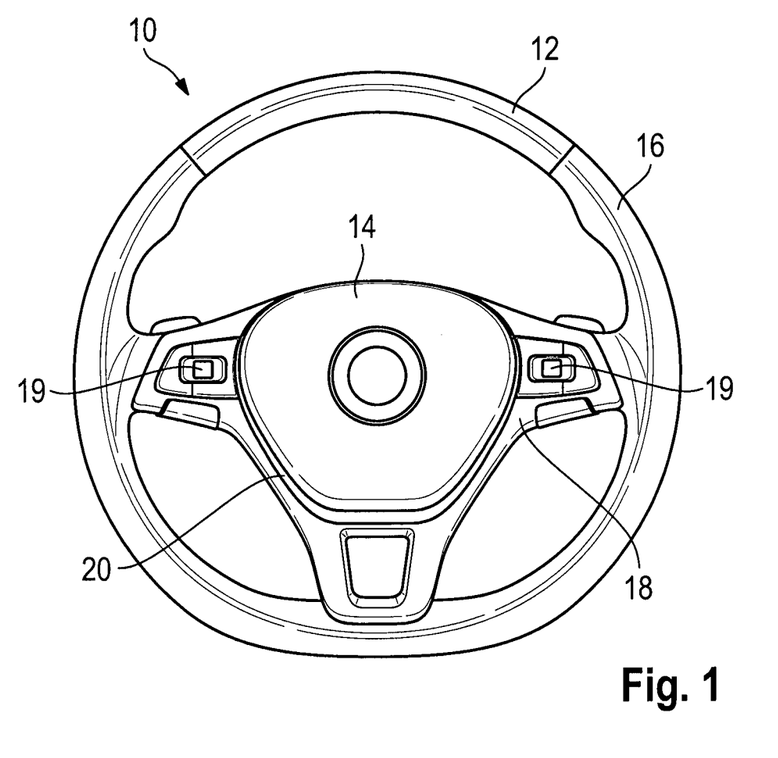
FIG. 1 shows a steering wheel assembly according to the invention.

FIG. 1 illustrates a steering wheel assembly 10 comprising a vehicle steering wheel 12 as well as a horn module 14, more exactly an airbag module. The horn module 14 is movably fastened to the vehicle steering wheel 12 and can be forced in an actuating direction B against the vehicle steering wheel 12 to actuate the horn (cf. also FIG. 2). The vehicle steering wheel 12 includes a steering wheel skeleton 15, a foam material 16 as well as a cover 18 in which plural operating elements 19 are integrated. The vehicle steering wheel 12 constitutes a support and the horn module 14 constitutes a component to be fastened thereon. Consequently, when hereinafter the steering wheel and the module are mentioned, this is merely an example of a support and a component which is not to be understood to be limiting.

Between the cover 18 and the horn module 14 a clearance 20 is provided. It is intended, on the one hand, to ensure low-friction movement of the horn module 14 in the actuating direction B and, on the other hand, to prevent the horn module 14 from getting jammed at the vehicle steering wheel 12 during actuation of the horn.

For optical reasons it is desired that said clearance is very narrow and uniform. In practice clearances of less than 0.5 mm are required. The added-up manufacturing tolerances of the vehicle steering wheel 12, the foam material 16, the cover 18 and the horn module 14, respectively, of such steering wheel assembly 10 amount to more than the required 0.5 mm in conventional manufacturing methods. During manufacture of the steering wheel assemblies this results in a non-uniform clearance.

In order to perfectly orientate the horn module 14 the steering wheel assembly 10 according to the invention, as is evident from FIG. 3, includes a module-side bearing unit 22 as well as a support-side bearing unit 24 which, as will be demonstrated hereinafter, after manufacture of the vehicle steering wheel 12 and the horn module 14 permits an orientation during assembly of the components.

Figure 3:
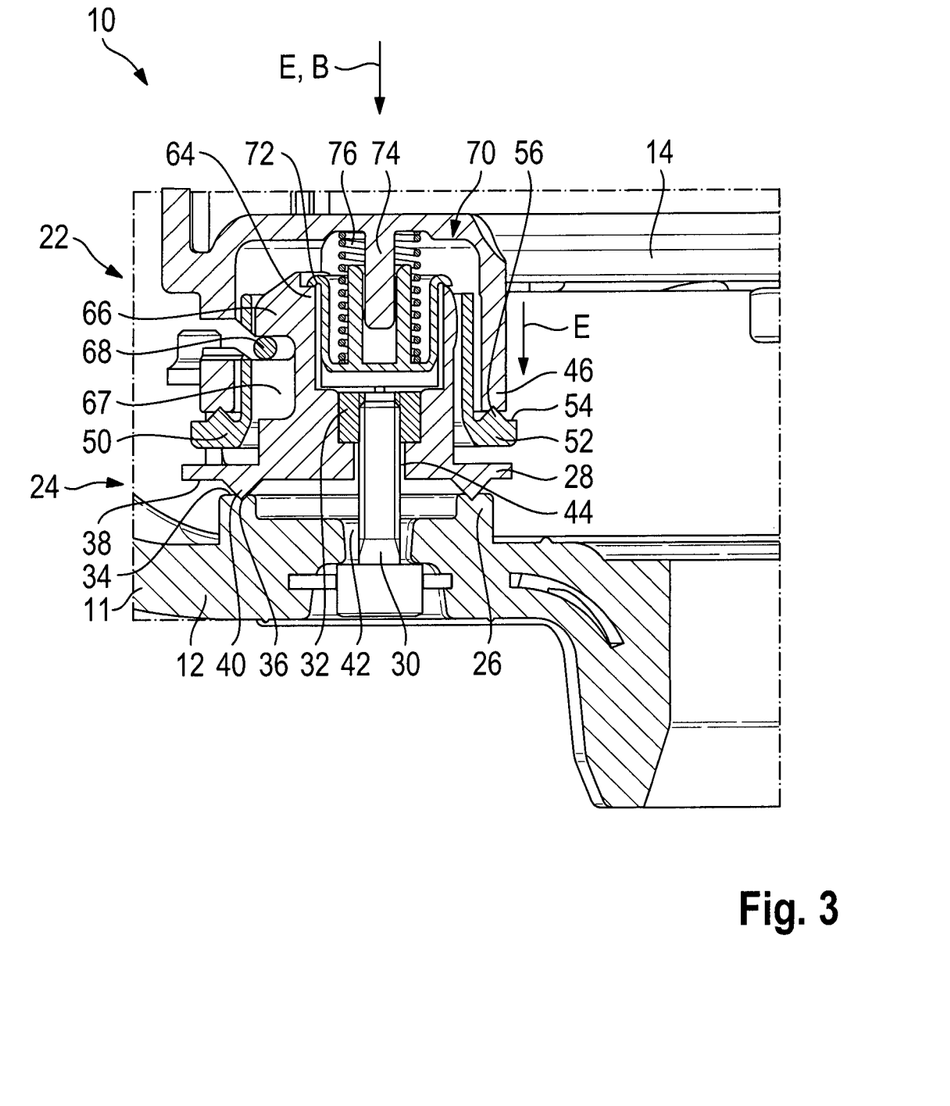
FIG. 3 shows a second sectional view across the steering wheel assembly of FIG. 1.
Figure 4:
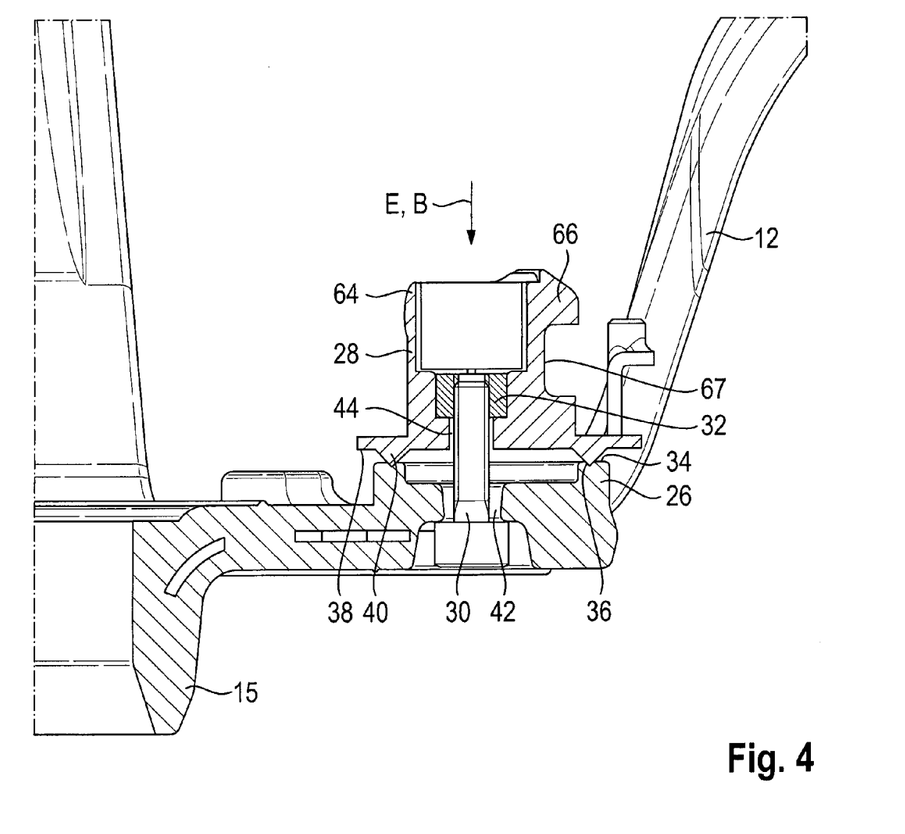
FIG. 4 shows a sectional view across a vehicle steering wheel according to the invention.

As is evident from the FIGS. 3 and 4, the steering wheel-side bearing unit 24 includes a first bearing member 26 which is formed integrally with the vehicle steering wheel 12, more exactly speaking with the skeleton 11, in this case.

A second bearing member 28 is connected to the steering wheel 12 via a fastening means 30, in this case a screw secured by a second fastening means 32 in the form of a nut located in the second bearing member 28. At each of the bearing members 26, 28 an acceptance 42, 44 is provided through which the fastening means 30 extends. The acceptances 42, 44 in this case are bores the diameter of which is selected such that the fastening means 30 has a defined play in the acceptances 42, 44. Thus the bearing members 26, 28 can be displaced against each other within a certain area and can be orientated relative to each other, as will be described hereinafter.

Figure 5:
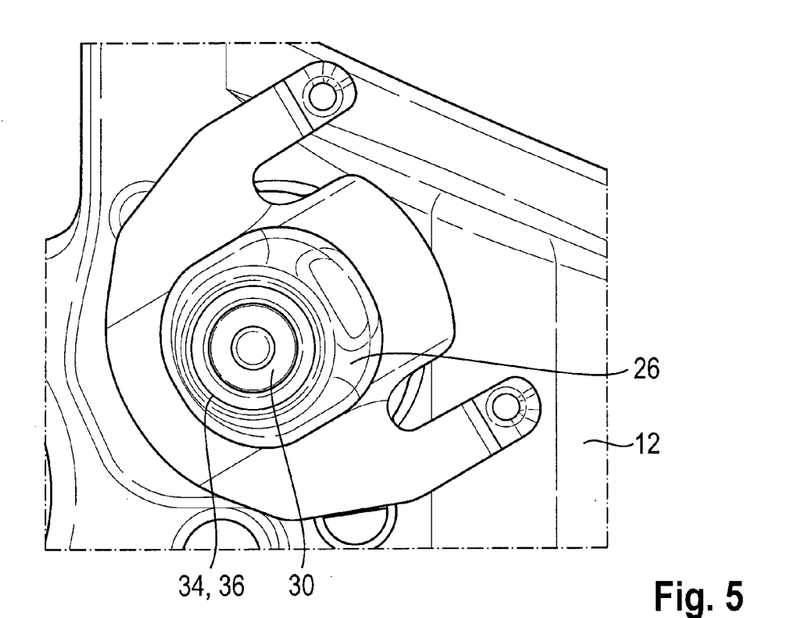
FIG. 5 shows a top view onto the vehicle steering wheel of FIG. 4 in the area of a bearing unit according to the invention.

The first bearing member 26 is provided with a bearing surface 34 which is substantially annular and has a substantially V-shaped groove 36, as is evident from FIG. 5. The second bearing member 28 includes an annular contact surface 38 corresponding to the bearing surface 34 and having a welding extension 40. Said welding extension 40 has a trapezoidal cross-section and is tapered in the direction of the bearing surface 34, wherein according to an embodiment the welding extension 40 does not yet protrude into the groove 36 during so called provisional orientation (orientation in xy direction).

The bearing surface 34 and the contact surface 38 are formed circumferentially, especially concentrically about the respective acceptance 42, 44.

For exactly positioning the second bearing member 28 on the first bearing member 26 and on the steering wheel 12, respectively, the second bearing member 28 is attached to the bearing surface 34 of the first bearing member 26 with the contact surface 38 and is orientated in the plane of the bearing surface 34, i.e. in the xy direction (provisional orientation), the contact surface 38 bearing on the bearing surface 34 merely by the welding extension 40.

If the welding extension 40 according to an alternative embodiment projects into the groove 36 already during provisional orientation and nevertheless has lateral play for the orientation in the xy direction, a particular pre-centering can be performed.

The welding extension 40 is manufactured to be slightly oversized. That is to say that transversely to the plane of the bearing surface 34, i.e. in the z direction, no exact orientation takes place. In order to permit such orientation the welding extension 40 is softened in a next step, for example by means of ultrasonic welding. Thus the second bearing member 28 can be positioned in the z direction while displacing the material of the welding extension 40.

When the final position is reached, the welding extension 40 is hardened. Softened plastic material of the welding extension 40 flows into the groove 36 and fills the same so that a form closure is provided in the xy direction. After hardening the bearing members 26, 28 are adjacent to each other by adhesive bond at the contact surface 38 and the bearing surface 34.

The bearing members 26, 28 are orientated individually for each steering wheel independently of the actual outer dimensions of the acceptance aperture in the vehicle steering wheel 12 into which the module 14 is inserted relative to the bearing unit.

In the embodiment shown here the second bearing member 28 is fastened, however, by the fastening means 30, 32 which also absorb the forces upon activation of the airbag. After exactly orientating and subsequently hardening the softened material, the first and second fastening means 30, 32 are tightened or clamped against each other, whereby the bearing surface 34 and the contact surface 38 are pressed against each other and thus the bearing members 26, 28 are fixed relative to each other. The bearing surface 34 and the contact surface 38 in a way form a counter-bearing for absorbing the compressive forces applied by the fastening means 30.

In the shown embodiment the bearing member 26 is a portion of the skeleton, i.e. made of metal, whereas the bearing member 28 is made of plastic. In the case of this coupling of materials the bearing members 26, 28 are not welded but the bearing member 28 is melted and adapts to the shape of the bearing member 26 in the area of the welding extension 40.

Depending on the material used for the bearing surface 34 and the contact surface 38 and on the type of softening of the welding extension 40, respectively, an adhesive connection can be produced between the bearing members 26, 28 (of preference equal plastic materials are used for both bearing members in this case), thereby the second bearing member 28 being fixed to the vehicle steering wheel 12.

Figure 6:
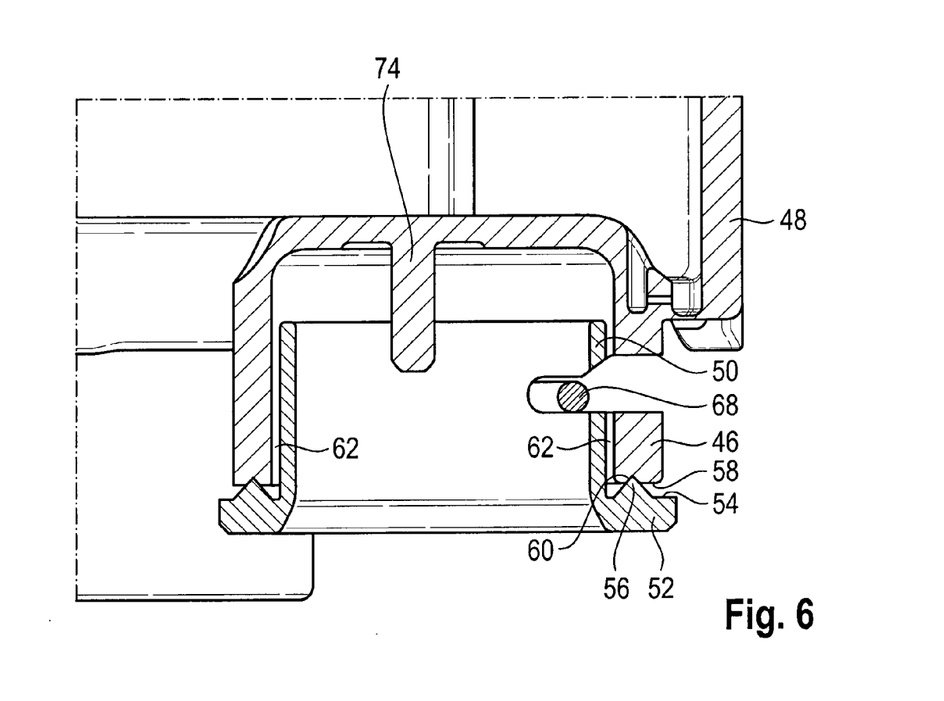
FIG. 6 is a sectional view across a horn module according to the invention comprising a bearing unit according to the invention.
Figure 7:
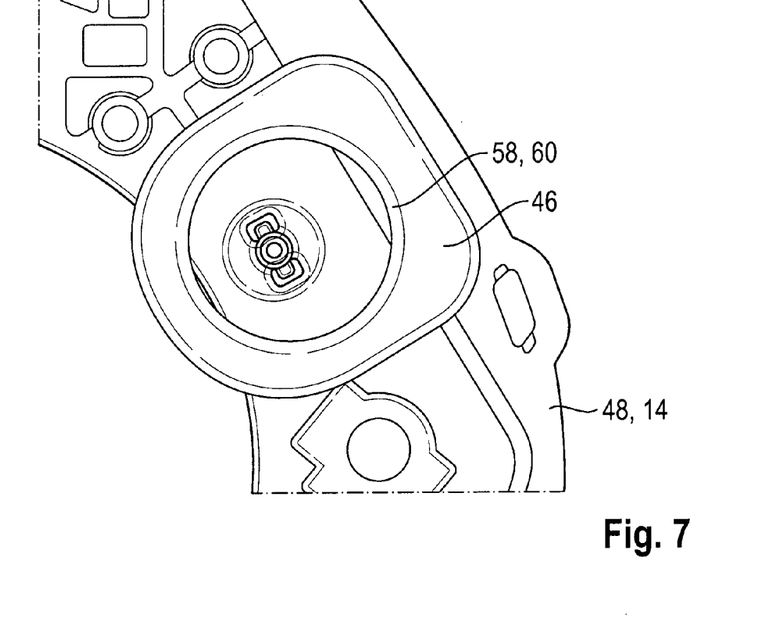
FIG. 7 is a top view onto the bearing unit of the module of FIG. 6.

The horn module 14 as well as the module-side bearing unit 22 is shown in detail in FIG. 6. The module-side bearing unit 22 equally includes a first bearing member 46 which is formed integrally with the housing 48 of the horn module 14, in this case the cup-shaped inflator support, as well as a second bearing member 50.

Each of the first bearing member 46 and the second bearing member 50 has a sleeve-like form and is made of plastic material, the second bearing member 50 being virtually inserted into the first bearing member 46.

The second bearing member 50 includes a flange portion 52 via which the bearing members 46, 50 are interconnected. The contact surface 54 of the second bearing member 50 at which the welding extension 56 is provided is arranged at the flange portion 52. The welding extension 56 which initially has a trapezoidal cross-section is formed to be annularly circumferential on the entire flange portion 52.

The first bearing member 46 has a corresponding bearing surface 58 arranged at an axial end of the sleeve-like first bearing member 46 and at which a groove 60 corresponding to the welding extension 56 is provided.

The provisional orientation of the second bearing member 50 is performed analogously to the provisional orientation of the bearing members 26, 28 of the vehicle steering wheel 12. In a first step the bearing members are provisionally orientated, the welding extension 56 being adjacent to the bearing surface 58. The groove 60 in this case merely serves as additional positioning aid.

Subsequently the contact surface 54 and the welding extension 56, reap., are softened via a sonotrode and the second bearing member 50 is finally positioned, wherein the material of the welding extension 40 is partly displaced and forced into the groove 60.

As is evident especially from FIG. 6, between the sleeve-like portions of the bearing members 46, 50 a radial annular gap 62 is provided by which between the first bearing member 46 and the second bearing member 50 a play is formed that is required for the bearing members 46, 50 to be orientated individually relative to each other, viz. independently of the outer dimensions of the module which are crucial to the clearance from the steering wheel.

The orientation of the steering wheel 12 and the module 14 can be explained in a simplified manner by the fact that the movable bearing member is brought to sort of a zero position relative to the respective positions of the clearance borders so that the bearing members 28, 50 which later are adjacent to or sliding along each other are jointly positioned at the zero position.

When the final position is reached, the material is hardened. In contrast to the support-side bearing unit 24 here no additional fastening means is provided, however. Therefore, by melting of the contact surface 54 with the bearing surface 58 an adhesive connection is made by which the bearing members 46, 50 are fastened to each other.

After the module-side and the support-side bearing units 22, 24 are connected to the horn module 14 and, resp., the vehicle steering wheel 12, during a next step the bearing units are nested to form a sliding bearing and, in this way, the horn module 14 is fastened to the vehicle steering wheel 12.

For fastening the second bearing member 28 of the support-side bearing unit 24 includes a cup-shaped portion 64 from which a lug 66 is radially projecting. Further a groove 67 is provided (cf. especially FIG. 3). The cup-shaped portion 64 is configured so that it can be inserted into the sleeve-like second bearing member 50 of the module-side bearing unit 22.

A stop spring 68 which can be locked in the groove 67 is provided at the second bearing member 50 of the module-side bearing unit 22. The horn module 14 thus can be simply attached to the vehicle steering wheel 12 in an inserting direction E substantially corresponding to the actuating direction B here and can be locked.

Figure 2:
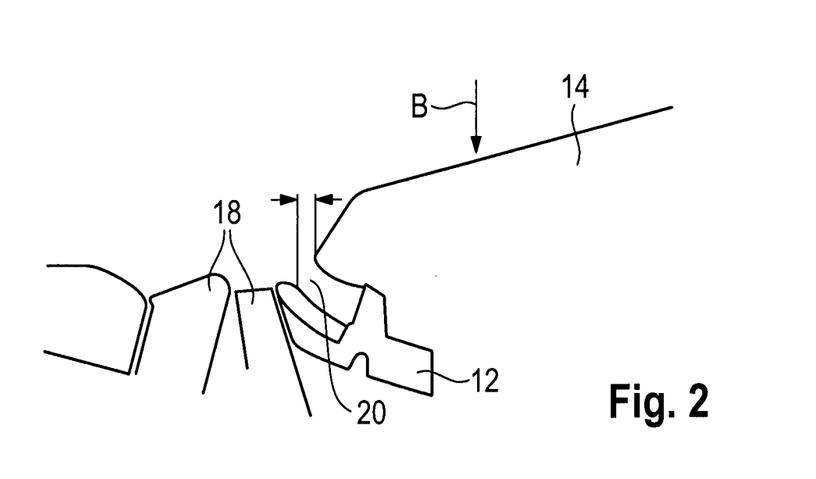
FIG. 2 shows a schematic sectional view across the steering wheel assembly of FIG. 1 illustrating the bearing units according to the invention as well as the horn module according to the invention and the vehicle steering wheel according to the invention.

As is evident especially from FIG. 2, the groove 67 is configured so that it allows for a limited movement of the module-side bearing unit 22 and thus of the horn module 14 in the actuating direction B.

Between the bearing units 22, 24 a reset unit 70 is additionally provided comprising a cup-shaped guide module 72 which is inserted in the second support-side bearing member 28. A module-side guide pin 74 protrudes into the guide module 72. Between the horn module 14 and the guide module 72 a spring element 76 acting on the horn module 14 against the actuating direction B is provided.

Figure 8:
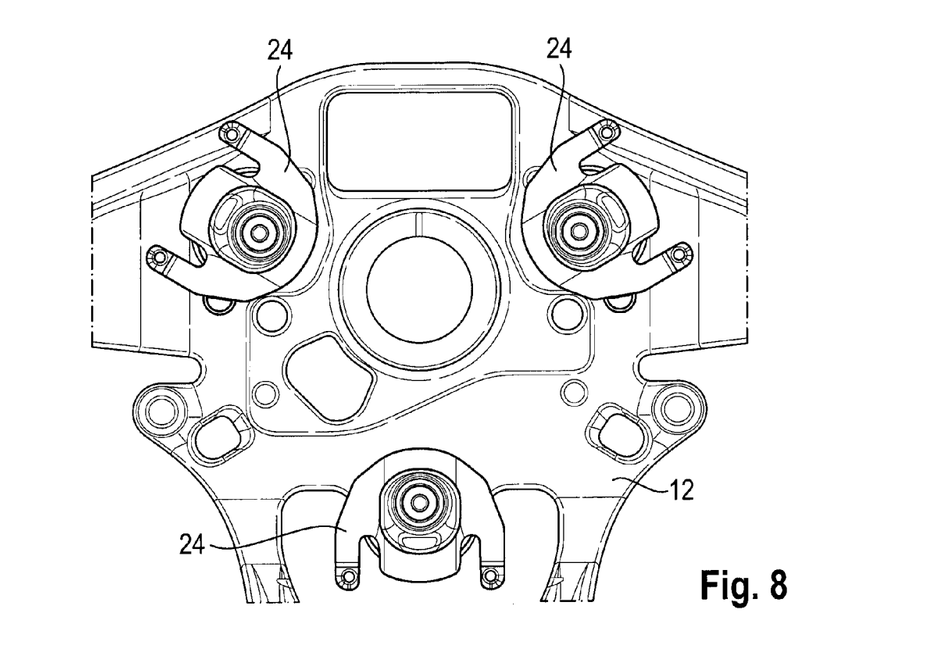
FIG. 8 is a top view onto the vehicle steering wheel of the steering wheel assembly of FIG. 1.
Figure 9:
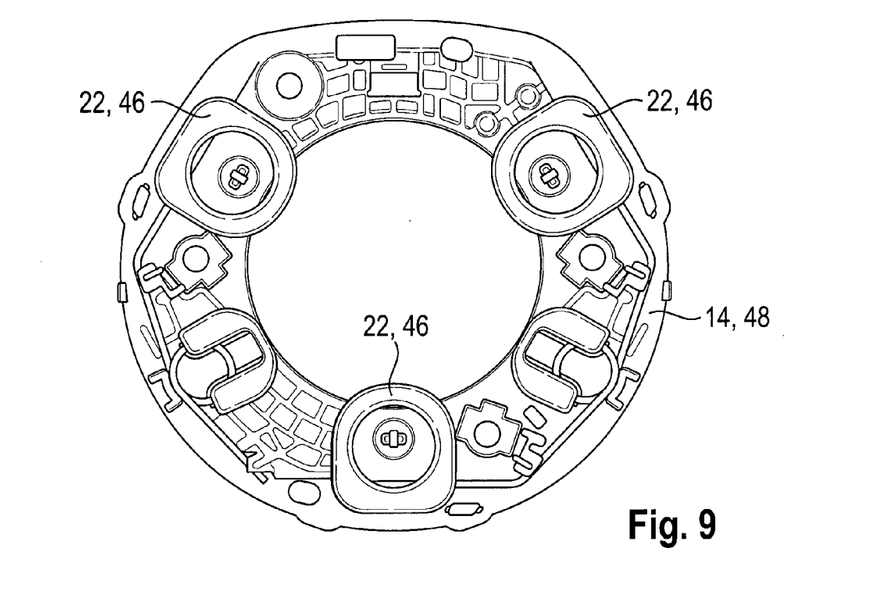
FIG. 9 is a top view onto the horn module according to the invention of the steering wheel assembly of FIG. 1.

As can be inferred from FIGS. 8 and 9, at the vehicle steering wheel 12 (FIG. 8) and at the module (FIG. 9) three respective bearing units 24 and 22 are provided. They permit safe three-dimensional fastening and positioning of the module 14 at the vehicle steering wheel 12.

Figure 10:
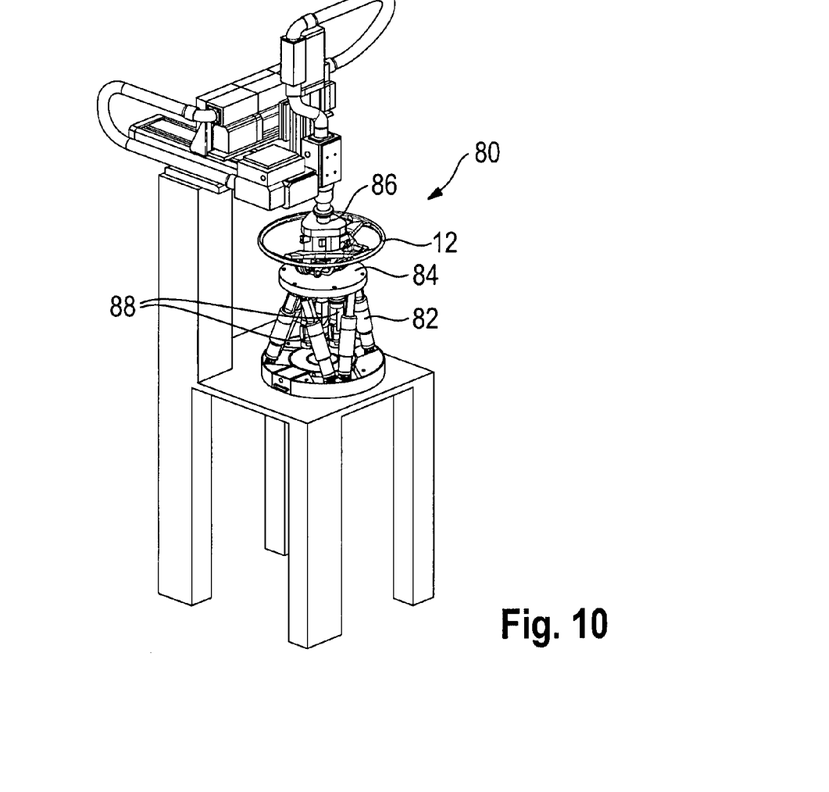
FIG. 10 shows an apparatus according to the invention for manufacturing a steering wheel assembly of FIG. 1.

An apparatus 80 for manufacturing a steering wheel assembly 10 according to the invention is shown in FIG. 10. The apparatus 80 includes a fixing unit 82 which in this case has a bench 84 movable in three directions in space. A support, in this case a vehicle steering wheel 12, or a component, in this case the horn module 14, can be arrested at the fixing unit 82.

The apparatus 80 further comprises at least one movable sonotrode 86 to which one or the bearing unit(s) 22 or 24 and a bearing member 26, 28, 46, 50 of a bearing unit 22, 24 can be fastened.

The apparatus includes a six-axis bench so that both the fixing unit 82 or the bench 84 of the fixing unit 82 and the sonotrode 86 are movable in three directions in space normal to each other and thus can be positioned at will relative to each other. It is also imaginable, however, that the bench 84 or the sonotrode 86 are stationary, i.e. only either of the two elements is movable.

The positioning system formed in this way is adapted to adjust the position of the bearing members 26, 28, 46, 50 relative to each other based on the measured positions so that the desired position is reached. This is effectuated in all three directions in space.

In the apparatus 80 a measuring system including a laser 90 is integrated which is adapted to determine the actual dimensions as well as the mutual position of the respective bearing units 22, 24 and the bearing members 26, 28, 46, 50, respectively, to the outer edges of the module and the module acceptance in the steering wheel. As an alternative, a separate station including measuring means can be used and the measured data are transmitted to the control unit of the apparatus.

Preferably a control unit is provided which is adapted to evaluate the signals of the measuring system and to establish the exact position of the bearing members 28, 50 therefrom. An additional screwing unit 88 enables the fastening means 30, 32 to be mounted without having to remove the steering wheel assembly 10 from the apparatus 80.

The method of manufacturing a steering wheel assembly according to the invention is shown in FIGS. 11 to 16.

Figure 11:
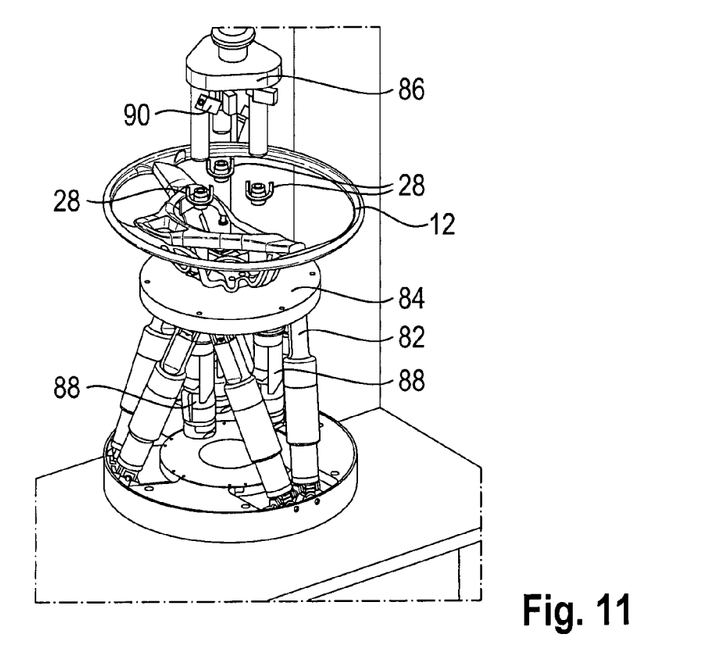
FIG. 11 shows a first method step for manufacturing a steering wheel assembly according to the invention.
Figure 12:
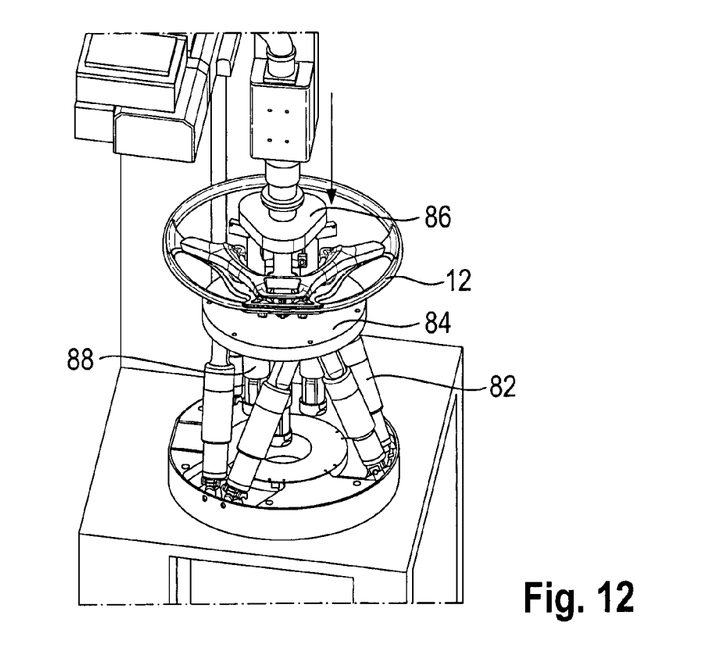
FIG. 12 shows a second method step for manufacturing a steering wheel assembly according to the invention.
Figure 13:
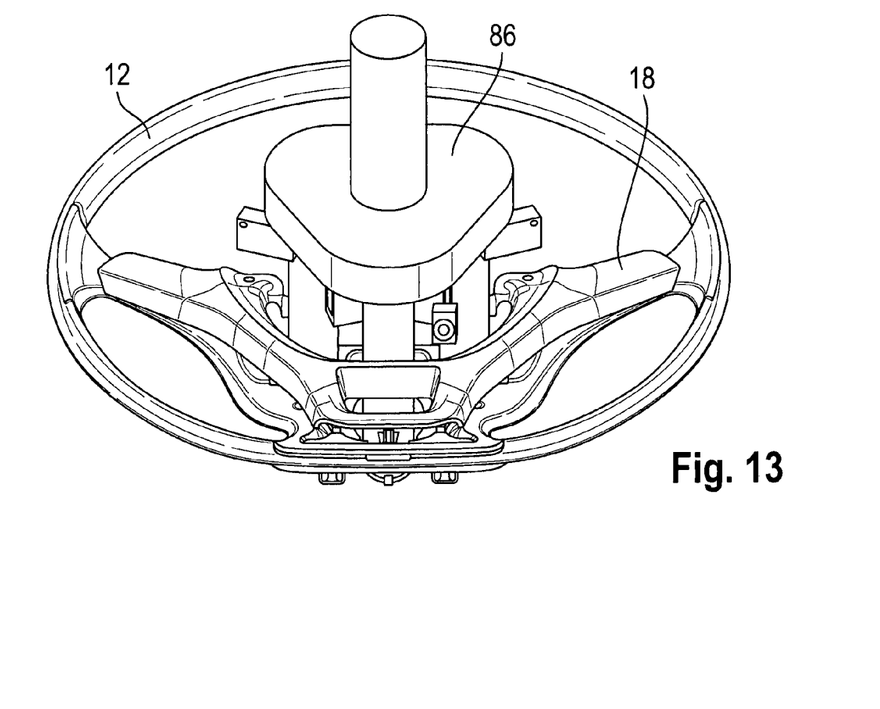
FIG. 13 shows a third method step for manufacturing a steering wheel assembly according to the invention.

In a first method step a component, in this case the vehicle steering wheel 12 including the integrally formed first bearing members 26 of the three bearing units 24 is arrested at the fixing unit 82 (FIG. 11). Subsequently, the three second bearing members 28 of the support-side bearing unit 24 are attached to the sonotrode 86 including three journal-like sonotrode followers (FIG. 12).

Figure 14:
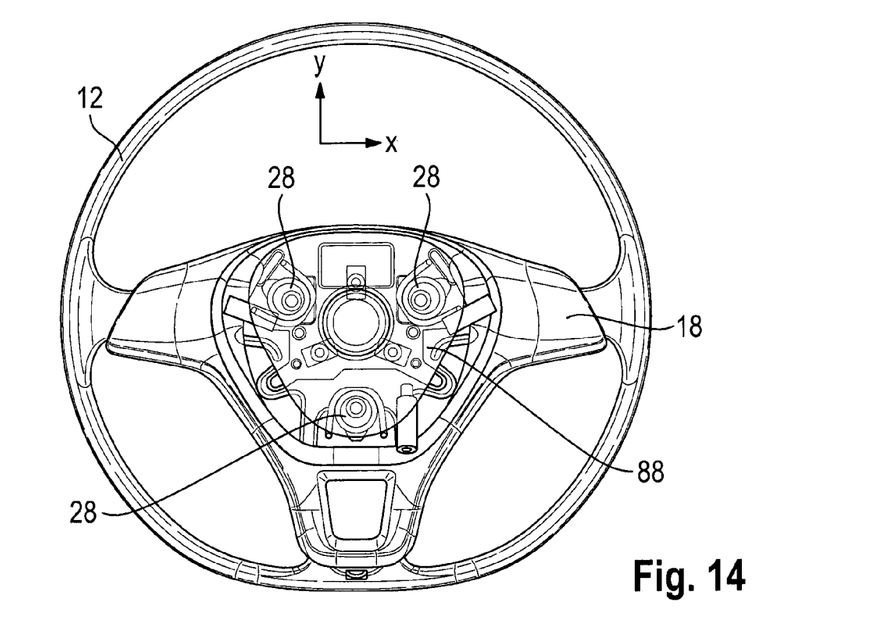
FIG. 14 shows a fourth method step for manufacturing a steering wheel assembly according to the invention.
Figure 15:
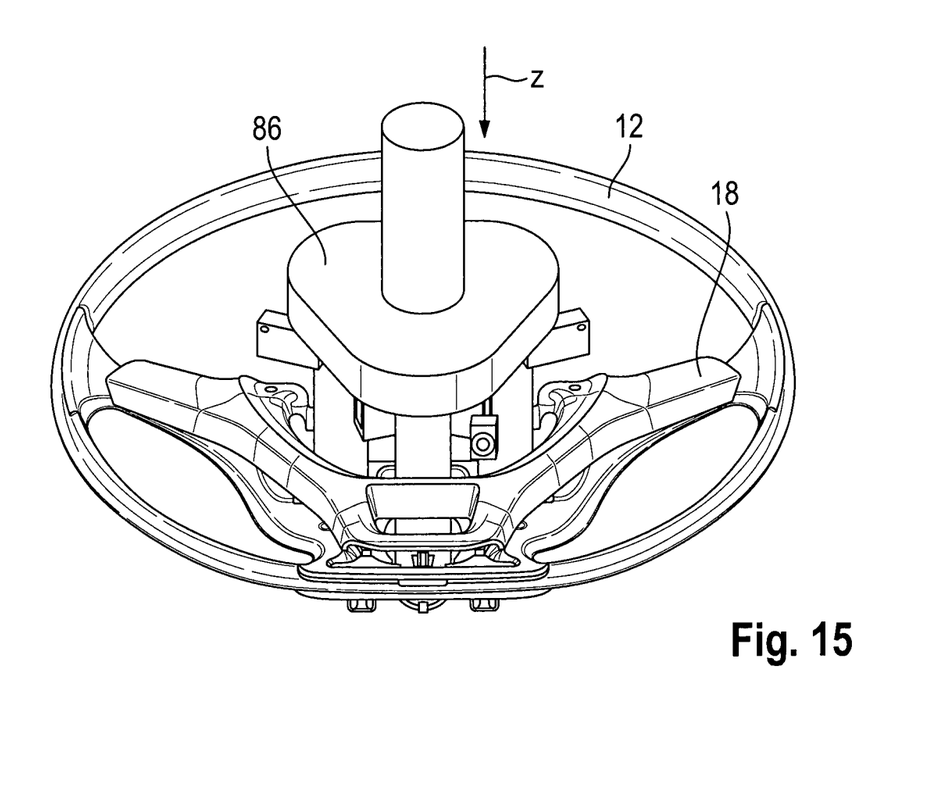
FIG. 15 shows a fifth method step for manufacturing a steering wheel assembly according to the invention.

During a next step (FIG. 13) the second bearing members 28 are guided by the sonotrode 86 against the vehicle steering wheel 12 and the first bearing members 26, respectively, and are orientated in the plane of the bearing surfaces 34, i.e. in the xy direction (FIG. 14).

After completed provisional orientation the sonotrode 86 is activated so that the welding extensions 40 are softened. As soon as the welding extensions 40 are softened, the sonotrode 86 is moved in the z direction (FIG. 15), until the desired position of the second bearing members 28 is reached (individual orientation).

Figure 16:
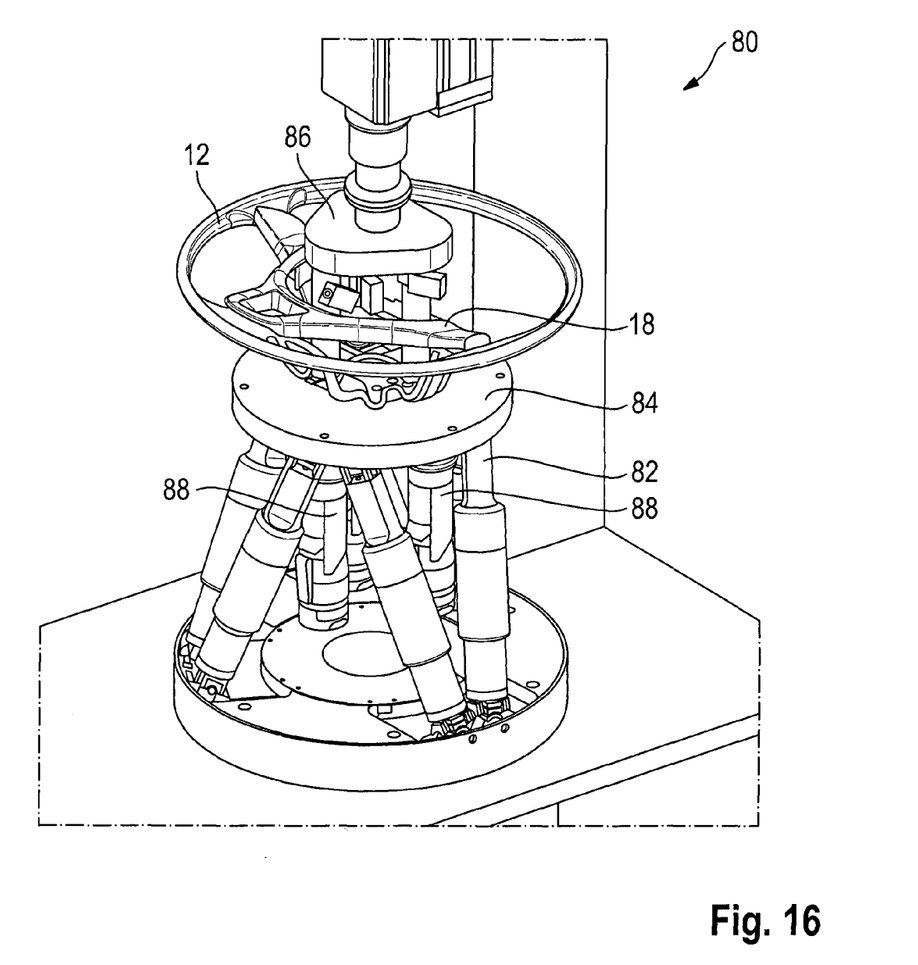
FIG. 16 shows a sixth method step for manufacturing a steering wheel assembly according to the invention.

After that the sonotrode 86 is deactivated so that the welding extensions 40 can harden. As soon as they are hardened, the bearing members 26, 28 are fixed against each other by the fastening means 30, 32 via the screwing unit 88 (FIG. 16).

The module-side bearing unit 22 is mounted analogously thereto, wherein the horn module 14 is fastened to the fixing unit 82 and each of the second bearing members 50 is held at the sonotrode 86.

The invention claimed is:

1. A method for series production of a vehicle steering wheel (12) and a horn module (14), wherein a module-side bearing unit (22) having at least two bearing members (46, 50) is connected to horn module (14) and a support-side bearing unit (24) having at least two bearing members (26, 28) is connected to the steering wheel (12), and wherein one of the bearing members (28, 50) of the respective bearing unit (22, 24) includes a contact surface (38, 58) and the other one of the bearing members (26, 46) includes at least one bearing surface (34, 54), comprising the steps of:
individually orientating the two bearing members (26, 28, 46, 50) of at least one bearing unit (22, 24) relative to each other as a function of the actual dimensions of at least one of the steering wheel (12) and the horn module (14),
fastening the two oriented bearing members (26, 28, 46, 50) to each other by softening at least one of the oriented bearing members (26, 28, 46, 50) such that the oriented bearing members (26, 28, 46, 50) are molded onto each other, and
engaging the bearing units (22, 24) with one another to fasten the steering wheel (12) to the horn module (14), the position of the steering wheel (12) and the horn module (14) relative to each other being defined by at least one bearing unit (22, 24).

2. The method according to claim 1, wherein the steps of orientating and fastening the bearing members (26, 28, 46, 50) comprises:
provisionally orientating the bearing members (26, 28, 46, 50) of at least one bearing unit (22, 24) relative to each other so that the bearing surface (34, 58) and the contact surface (38, 54) contact each other,
softening at least one of the bearing members (26, 28, 46, 50) in the area of at least one of the bearing surface (34, 58) and the contact surface (38, 54) with an ultrasonic sound,
individually finally orientating the bearing members (26, 28, 46, 50) relative to each other while deforming at least one of the bearing members (26, 28, 46, 50) in the softened area in three spatial directions, and
fastening the two bearing members (26, 28, 46, 50) to each other by at least one of adhesive closure and form closure.

3. The method according to claim 1, wherein the bearing members (26, 28, 46, 50) are positioned as a function of the actual dimensions of at least one of the installed steering wheel (12) and the installed horn module (14) during at least one of provisional and final orientation relative to each other, wherein the bearing unit (22, 24) is secured after individual orientation by additional fastening means (30) on at least one of the steering wheel (12) and the horn module (14) by at least one bolt or at least one screw, wherein the provisional orientation is performed in at least one of the plane of the bearing surface (34, 58) and the contact surface (38, 54) and the final orientation is performed perpendicularly to at least one of the bearing surface (34, 58) and the contact surface (38, 54).

4. The method according to claim 1, wherein at least one bearing member (28, 46) is coupled to and held at a sonotrode (86) wherein at least one of the steering wheel (12) and the horn module (14) is clamped into an adjustable holder comprising a six-axis bench.

5. The method according to claim 1, wherein the bearing members (26, 28, 46, 50) connected to each other are orientated only on the basis of either the dimensions of the steering wheel (12) or the dimensions of the horn module (14) depending on whether the bearing members (26, 28, 46, 50) are connected to the bearing unit (22, 24) of the steering wheel (12) or the horn module (14), wherein a measuring step is provided in which the relative displacement of the bearing members (26, 28, 46, 50) relative to each other required for the final orientation is determined and wherein after orientating the bearing members (26, 28, 46, 50) the steering wheel (12) and the horn module (14) are fastened to each other and the bearing units (22, 24) are nested in each other and form a guide.

6. The method according to claim 1, wherein the steering wheel (12) has a skeleton and is provided with at least one of a foam material and a separate cover (18) before the bearing unit (24) is arranged at the vehicle steering wheel (12), wherein one of the bearing members (28) of the bearing unit (24) is movable and is orientated as a function of the individual dimensions of at least one of the foam material and the cover (18) relative to the other bearing member (26) and is fastened thereto.

7. A bearing unit (22, 24) of a vehicle assembly that includes a vehicle steering wheel (12) and a horn module (14) fastened to the steering wheel (12), wherein the bearing unit (22, 24) comprises at least two bearing members (26, 28, 46, 50) which are orientated individually in three axes relative to each other and are interconnected by an ultrasonic weld.

8. The bearing unit according to claim 7, wherein one of the bearing members (26, 28, 46, 50) of the respective bearing unit (22, 24) has a contact surface (38, 58) and the other one of the bearing members (28, 50) has at least one bearing surface (34, 54), wherein at least one welding extension (40, 56) is formed on at least one of the contact surface (38, 58) and the bearing surface (34, 54) at which the bearing members (26, 28, 46, 50) contact each other and are welded to each other, wherein each welding extension (40, 56) is tapered toward the opposite bearing member (26, 28, 46, 50).

9. The bearing unit according to claim 7, wherein the bearing unit (22, 24) is a guiding sleeve and wherein an additional fastening means (30) formed as a separate member is provided which acts on one of the bearing members (26, 28, 46, 50) for additional fastening of the bearing unit (22, 24), wherein one of the bearing members (26, 28, 46, 50) is one or an integrally formed extension of a steering wheel skeleton, an injection molding around the steering wheel or a horn module acceptance.

10. A vehicle steering wheel (12) comprising at least one fastening acceptance for the horn module (14), wherein at the fastening acceptance at least one bearing unit (24) according to claim 7 is provided for supporting and positioning the horn module (14).

11. The vehicle steering wheel according to claim 10, wherein a bearing member (26) is integrally formed at a steering wheel skeleton or at an injection molding around the steering wheel (12).

12. A horn module (14) for fastening to the vehicle steering wheel according to claim 10, wherein at least one bearing unit (22) including at least two bearing members (26, 28, 46, 50) orientated individually in three axes relative to each other and interconnected by ultrasonic welding is provided at the horn module (14), wherein the bearing unit (22) is formed integrally with a cup-shaped horn module acceptance and includes a radially outer sleeve-like bearing member (46) and a radially inner sleeve-like bearing member (50) arranged therein, which are interconnected by a flange portion (52) such that a radial annular clearance (62) is provided between the bearing members (46, 50).

13. A steering wheel assembly (10) including a vehicle steering wheel (12) comprising at least one of the features of claim 10 and a horn module (14) fastened to the vehicle steering wheel (12), wherein at least one bearing unit (22) having at least two bearing members (26, 28, 46, 50) orientated individually in three axes relative to each other and interconnected by ultrasonic welding is provided at the horn module (14), wherein the bearing unit (22) is formed integrally with a cup-shaped horn module acceptance and includes a radially outer sleeve-like bearing member (46) and a radially inner sleeve-like bearing member (50) arranged therein, which are interconnected by a flange portion (52) such that a radial annular clearance (62) is provided between the bearing members (46, 50), wherein between the vehicle steering wheel (12) and the horn module (14) the bearing units (22, 24) are provided by which the horn module (14) is fastened to the vehicle steering wheel (12) in an axially movable manner.

14. The steering wheel assembly according to claim 13, wherein a fastening means (30) or an acceptance (42, 44) for a fastening means (30) is provided at the vehicle steering wheel (12) at the horn module (14) and another fastening means (32) is provided at the bearing member (26, 28, 46, 50), wherein the fastening means (30, 32) additionally secures the bearing member (28, 50) to be moved during orientation on the steering wheel side or on the module side.

15. The steering wheel assembly according to claim 13, wherein the horn module (14) is secured to the vehicle steering wheel (12) by a stop spring (68) and wherein a groove for clicking the stop spring (68) is formed at the bearing unit (24).

16. An apparatus (80) for manufacturing a a steering wheel assembly including a vehicle steering wheel (12) and a horn module (14) fastened to the vehicle steering wheel (12), the vehicle steering wheel (12) comprising at least one fastening acceptance for the horn module (14), wherein at least one bearing unit (24) is provided at the fastening acceptance for supporting and positioning the horn module (14), wherein at least one bearing unit (22) is provided at the horn module (14) and includes at least two bearing members (26, 28, 46, 50) orientated individually in three axes relative to each other and interconnected by ultrasonic welding, wherein the bearing unit (22) is formed integrally with a cup-shaped horn module acceptance and includes a radially outer sleeve-like bearing member (46) and a radially inner sleeve-like bearing member (50) arranged therein, which are interconnected by a flange portion (52) such that a radial annular clearance (62) is provided between the bearing members (46, 50), wherein between the vehicle steering wheel (12) and the horn module (14) bearing units (22, 24) are provided by which the horn module (14) is fastened to the vehicle steering wheel (12) in an axially movable manner by the method according to claim 1, wherein the apparatus (80) includes at least one movable sonotrode (86) and a fixing unit (82) for arresting at least one of the vehicle steering wheel (12) and the horn module (14), wherein the fixing unit (82) and the sonotrode (86) are movable relative to each other.

17. The apparatus according to claim 16, wherein the apparatus (80) comprises at least one of the following features:
a measuring system which determines the mutual position of the respective bearing unit (22, 24) to the dimensions of the corresponding steering wheel (12) and horn module (14),
a positioning system which permits adjustment of the bearing members (26, 28, 46, 50) relative to each other in three spatial directions,
a multi-screwing unit (88) for automatically arresting the orientated bearing unit (22, 24) at the steering wheel (12) or the horn module (14),
a control unit for controlling the positioning system as a function of the data established in the measuring system so as to orientate the bearing members (26, 28, 46, 50) relative to each other, and
a holder for the bearing member (28, 50) to be moved, wherein the holder is formed by the sonotrode (86).

18. The apparatus according to claim 17, wherein the measuring system includes at least one laser for detecting the position of the steering wheel (12) or the hub module (14), wherein the positioning system is a six-axis bench.

19. A method for series production of a vehicle steering wheel (12) and a horn module (14), wherein a module-side bearing unit (22) having at least two bearing members (46, 50) is connected to the horn module (14) and a support-side bearing unit (24) having at least two bearing members (26, 28) is connected to the steering wheel (12), comprising the steps of:
individually orientating the two bearing members (26, 28, 46, 50) of at least one bearing unit (22, 24) relative to each other as a function of the actual dimensions of at least one of the steering wheel (12) and the horn module (14),
softening at least one of the oriented bearing members (26, 28, 46, 50) to mold the oriented bearing members (26, 28, 46, 50) onto one another to secure the oriented bearing members (26, 28, 46, 50) together, and
engaging the bearing units (22, 24) with one another to fasten the steering wheel (12) to the horn module (14).

20. The method according to claim 19, wherein the steps of orientating and softening the bearing members (26, 28, 46, 50) comprises:
provisionally orientating the bearing members (26, 28, 46, 50) of at least one bearing unit (22, 24) relative to each other,
softening at least one of the bearing members (26, 28, 46, 50) with an ultrasonic sound,
individually finally orientating the bearing members (26, 28, 46, 50) relative to each other while deforming at least one of the bearing members (26, 28, 46, 50) in the softened area in three spatial directions, and
fastening the two bearing members (26, 28, 46, 50) to each other by at least one of adhesive closure and form closure.

* * * * *